Patented Dec. 19, 1933

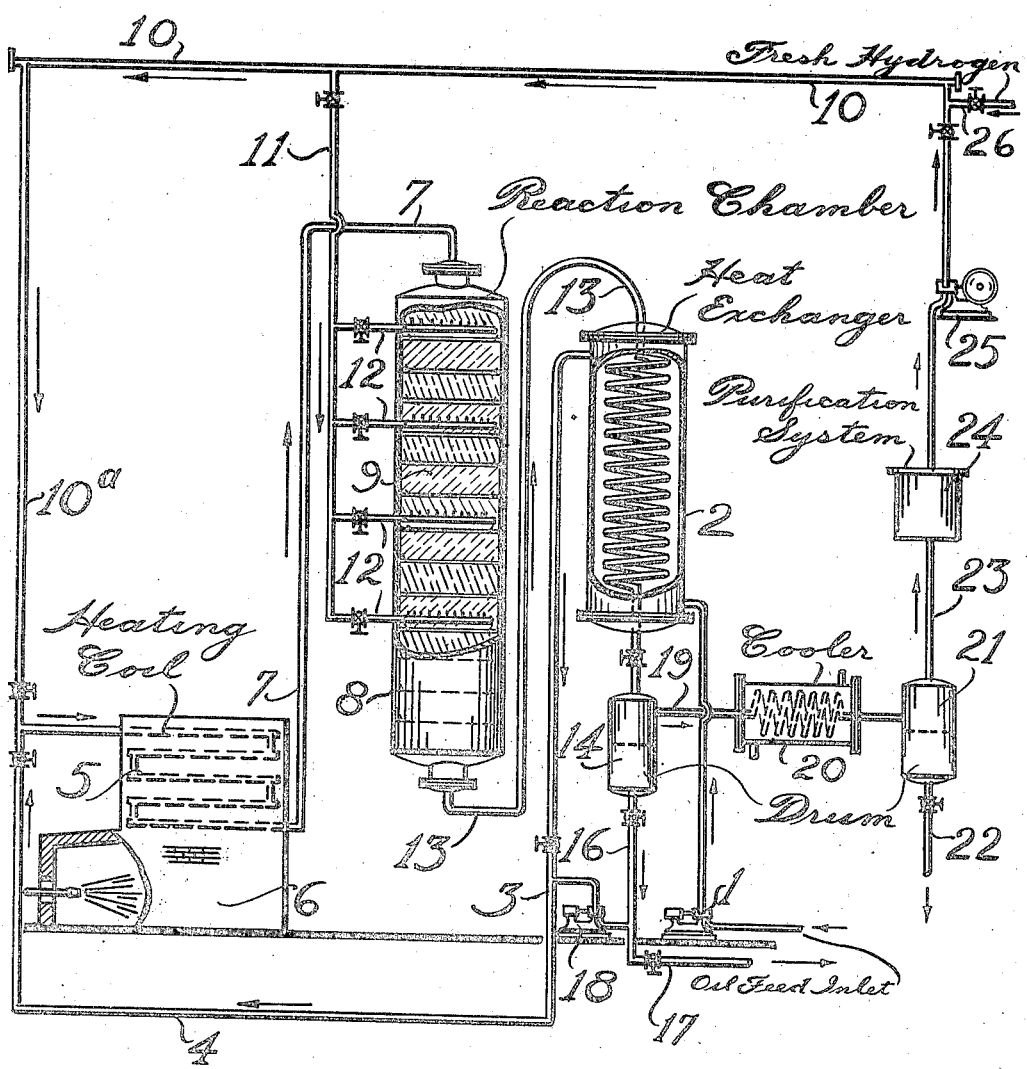

1,940,649

UNITED STATES PATENT OFFICE 1,940,649

PROCESS FOR PURIFYING UNREFINED HYDROCARBON OILS BY ACTION OF HIGH PRESSURE HYDROGEN

Robert P. Russell, Baton Rouge, La., assignor to Standard-I. G. Company

Application February 8, 1930. Serial No. 426,827

4 Claims. (Cl. 196—78)

The present invention relates to a process for obtaining valuable refined hydrocarbon oils from crude or unrefined hydrocarbon oils by reaction of hydrogen under elevated temperature and pressure. My invention will be fully understood from the following description and the drawing, which illustrates one form of apparatus suitable for carrying out my invention.

The drawing is a diagrammatic view in sectional elevation of an apparatus constructed to accomplish the steps of my invention and indicates the flow of the various materials used in the process. Referring to the drawing, a hydrocarbon oil is fed from any convenient source not shown by pump 1 through a heat exchanger 2 and by lines 3 and 4 into a heating coil 5. The heating coil is mounted in a suitable furnace setting 6 and discharges through line 7 into the top of a vertical reaction chamber 8. The reaction chamber is constructed of materials adapted to withstand high temperatures in the neighborhood of 900 to 1000° F. and pressures of 3000 pounds per square inch or higher. Suitable catalytic material indicated at 9 is packed into the drum and may be supported in any suitable manner, for example; on trays or by other means. Hydrogen under high pressure is supplied through a line 10 and may be admitted to the inlet of coil 5 through branch pipe 10a. Additional hydrogen may be added directly to the drum through a line 11 and a plurality of branch pipes 12. Mixture of oil, either in liquid or vapor state, with hydrogen is passed downwardly through the reaction chamber and is discharged by a pipe 13 through heat exchanger 2 and into a drum 14. Condensate may be withdrawn from the drum by means of line 16 and 17 to any convenient storage tank, (not shown) or may be returned by pump 18 to line 4 and circulated by this means through the coil and drum for a second treating period. Uncondensed vapors are passed from separator 14 by line 19 through cooler 20 and into a gas separation drum 21. The condensate is withdrawn by line 22 to a light oil storage tank (not shown) and gas is removed under high pressure by line 23, to a purification system 24. The purification may be affected in any convenient manner for example; by scrubbing with caustic soda or other similar treating agents capable of removing hydrogen sulphide. A secondary wash may also be given using a heavy oil which will remove hydrocarbon constituents from the gas. Purified gas then flows to a booster pump 25 and is circulated to line 10 as stated above. Fresh or makeup hydrogen may be added by line 26.

In the operation of my process I have observed that the treatment of oil with hydrogen under high temperature and pressure is often unsatisfactory due to the improper mixing of the oil and gas and to the poor distribution over the catalytic agent. This results in a channeling through the catalytic mass and in consequence treated oil lacks uniformity and often a considerable portion of the oil passes through the reactor without adequate reaction. For this reason the product is often rich in sulphur compounds which are capable of removal with high pressure hydrogen where proper contact with the catalyst is maintained. I have discovered that this effect may be to a large degree overcome by directing the flow of oil and gas downwardly over the catalytic mass. The channelling effect is especially undesirable in the process of treating oil in the liquid phase, but it is also undesirable although to a lesser extent where oil passes through the reactor in a vapor condition.

The temperature and pressure under which reaction proceeds depend to some extent on the nature of the products and the results desired, but in general temperature should be above about 700° F. and pressure in excess of about 20 atmospheres. In the treatment of low grade kerosene to produce valuable burning oil the temperature is ordinarily between 750 and 850° F. and the same temperatures are generally used in the treatment of heavy oils to produce improved lubricants. Where kerosene or gas oil is fed in the vapor phase to produce large quantities of light oils suitable for motor fuel, it is desirable to maintain a temperature from about 870° upward and preferably from about 900 to 1000° F. The quantity of hydrogen required to be circulated is generally in excess of about 3000 cubic feet per barrel of oil and it is desirable to circulate a quantity greatly in excess of this volume, for example; 10,000 to 15,000 cubic feet per barrel of oil. In the operation of the process the oil is raised to a temperature of at least 700 or 750° in the coil, preferably in the presence of hydrogen and is passed through the drum at a rate depending upon the nature of the process. For example; where heavy oils are fed for the production of lubricants it is necessary to limit the feed rate to about 0.5 volume of oil per volume of catalyst space per hour, but the rate may be much higher where kerosene or somewhat heavier oils are treated in the vapor phase. In such cases the rate may be in excess of 1.0 volume of oil per volume of catalyst space per hour and may be in excess of even 1.5 volumes oil. It will be understood that the feed rate in all cases is such that although there is at least some formation of low boiling hydrocarbons, this formation of low boiling hydrocarbons is, nevertheless, definitely limited. In all cases I prefer that the mixture of oil and gas pass downwardly over the catalytic mass, which may comprise materials such as molybdenum, chromium or tungsten oxides, or other compounds or mixtures of these materials with each other or with other materials, for example; alkali or alkaline earth compounds, rare earths, zinc oxide or alumina. All of these catalytic materials are known to be sulfactive, that is they retain their hydrogenating activity even in the presence of sulfur or sulfur containing compounds.

My invention is not to be limited by any theory of the mechanism of the chemical reaction nor by any specific example of the means by which my process may be carried out, but only by the attached claims in which I wish to claim all novelty inherent in the invention.

I claim:

1. In a process for refining impure hydrocarbon distillates comprising treating such distillates with hydrogen under pressure between 20 and 200 atmospheres at temperatures between 700 and 850° F. in the presence of sulfactive catalytic materials which promote hydrogenation, the improvement which comprises passing the hydrocarbon and hydrogen continuously downwardly through a vertical elongated reaction zone packed with lumps of the catalytic material at a rate below about 1.5 volumes of hydrocarbon per volume of catalyst per hour, and withdrawing and cooling the product.

2. In a process for preparing valuable lubricating oils from heavy hydrocarbon oils by treating such oils in liquid phase with hydrogen under pressure in excess of 20 atmospheres at temperatures between 700 and 850° F. and in the presence of lumps of a sulfactive catalytic material which promotes hydrogenation for a limited time to definitely limit the formation of low boiling hydrocarbons, the improvement which comprises passing the oil and hydrogen continuously downwardly over the lumps of catalytic material, and withdrawing and cooling the product.

3. Process according to claim 2 in which the oil and hydrogen are passed downwardly over the lumps of catalytic material in a vertical elongated reaction zone at a rate of about 0.5 volume of oil per volume of catalyst per hour.

4. In a process for the production of lubricating oils of improved quality from heavy hydrocarbon oil which comprises subjecting such heavy hydrocarbon oil to destructive hydrogenation under pressure in excess of 20 atmospheres, at temperatures between 700 and 1000° F. in the presence of sulfactive catalytic material and for a time such that there is at least some formation of low boiling hydrocarbons but this formation of low boiling hydrocarbons is definitely limited, the improvement which comprises causing the mixture of hydrocarbon oil and hydrogen to flow continuously downwardly through a reaction zone packed with lumps of the catalytic material, and then withdrawing and cooling the product.

ROBERT P. RUSSELL.